(12) United States Patent
Strzala

(10) Patent No.: US 11,460,084 B2
(45) Date of Patent: Oct. 4, 2022

(54) DISC BRAKE, IN PARTICULAR FOR COMMERCIAL VEHICLES, AND HOLDING UNIT FOR A CABLE OF SUCH DISC BRAKE

(71) Applicant: WABCO Europe BVBA, Brussels (BE)

(72) Inventor: Wieslaw Strzala, Byczyna (PL)

(73) Assignee: WABCO Europe BVBA, Brussels (BE)

( * ) Notice: Subject to any disclaimer, the term of this patent is extended or adjusted under 35 U.S.C. 154(b) by 79 days.

(21) Appl. No.: 17/075,994

(22) Filed: Oct. 21, 2020

(65) Prior Publication Data

US 2021/0115990 A1 Apr. 22, 2021

(30) Foreign Application Priority Data

Oct. 22, 2019 (EP) ..................................... 19204635

(51) Int. Cl.
| | |
|---|---|
| *F16D 66/02* | (2006.01) |
| *F16D 55/22* | (2006.01) |
| *F16D 65/00* | (2006.01) |
| *F16D 65/092* | (2006.01) |
| *F16D 65/12* | (2006.01) |
| *F16D 55/00* | (2006.01) |

(52) U.S. Cl.
CPC ........... *F16D 66/021* (2013.01); *F16D 55/22* (2013.01); *F16D 65/0068* (2013.01); *F16D 65/0081* (2013.01); *F16D 65/092* (2013.01); *F16D 65/12* (2013.01); *F16D 2055/0016* (2013.01); *F16D 2055/0037* (2013.01)

(58) Field of Classification Search
CPC ............... F16D 66/021; F16D 65/0068; F16D 65/0081; F16D 2055/0016; F16D 65/12; F16D 55/22; F16D 65/092; F16D 2055/0037; F16L 3/00; B60T 17/22
See application file for complete search history.

(56) References Cited

U.S. PATENT DOCUMENTS

| 5,667,177 A | 9/1997 | Van Leeuwen | |
|---|---|---|---|
| 5,927,445 A | 7/1999 | Bieker | |
| 2015/0041258 A1* | 2/2015 | Asen | F16D 65/0974 248/65 |

FOREIGN PATENT DOCUMENTS

| DE | 1845448 U | 1/1962 |
|---|---|---|
| DE | 3926437 A1 | 2/1991 |
| DE | 4016273 A1 | 12/1991 |
| DE | 102017107136 A1 | 10/2017 |
| EP | 2621020 A2 * | 7/2013 |

(Continued)

*Primary Examiner* — Pamela Rodriguez
(74) *Attorney, Agent, or Firm* — Dickinson Wright PLLC

(57) ABSTRACT

A system for mounting a signal cable to a disc brake includes a cover plate, an actuator opening in a region of the cover plate configured to allow passage of an actuation device, and a signal cable fixation member (80) for mounting the signal cable to the cover plate, the signal cable fixation member (80) including an attachment part (82) and a signal cable guiding part (84). The attachment part (82) engages with the cover plate and the signal cable guiding part (84) guides the signal cable towards a side edge of the cover plate. A connecting part (86) between the attachment part (82) and the signal cable guiding part (84) spaces apart a signal cable guide axis A of the signal cable guiding part (84) from an engagement axis B of the attachment part (82) by an offset d.

15 Claims, 8 Drawing Sheets

(56) References Cited

FOREIGN PATENT DOCUMENTS

EP          2664815 A1    11/2013
GB          1582567 A     1/1981

\* cited by examiner

US 11,460,084 B2

DISC BRAKE, IN PARTICULAR FOR COMMERCIAL VEHICLES, AND HOLDING UNIT FOR A CABLE OF SUCH DISC BRAKE

CROSS-REFERENCE TO RELATED APPLICATIONS

This application claims the benefit of previously filed EPO Patent Application No. EP 19204635.7, filed Oct. 22, 2019, the entire content of which is hereby incorporated by reference in its entirety.

FIELD

The present disclosure relates to a system for mounting a signal cable to a disc brake. More particularly, the present disclosure relates to a system having a cover plate configured to be fastened to, or constituting, an actuation side of a disc brake in an accommodation space of the brake caliper, the cover plate preferably having a sheet-like and generally rectangular shape, and an actuation opening in a region of the cover plate configured to allow passage of actuation device, and signal cable fixation member for mounting a signal cable to the cover plate, the signal cable fixation member having an attachment part and a signal cable guiding part, the attachment part being configured to engage with an attachment counterpart in or on the cover plate and the signal cable guiding part being configured to guide a signal cable towards a side edge of the cover plate.

BACKGROUND

Systems for mounting a signal cable to a disc brake are generally known. It is the aim of such systems to safely guide sensor cables that originate at sensors used to determine the condition of brake pads typically out of the body of a brake caliper to a vehicle side of the disc brake. Because the disc brake is actuated by an actuation unit that is usually located on the vehicle side of the disc brake, the vehicle side is also referred to as actuation side, whereas the opposite side of the actuation side is denoted as wheel side. As disc brakes are often equipped with a so-called spring hanger spanning over an opening in the brake caliper that is used for introducing and exchanging brake pads, it has been found to be beneficial to guide such a signal cable in the proximity of such a spring hanger to the actuation side of the brake caliper. This allows the signal cable length to be kept short and also ensures that such a sensor and the cable are accessible after the disc brake has been assembled. Such a system is, for instance, known from DE 10 2017 107 136.

It is further known that, from the actuation sided end of the spring hanger, the signal cable can be further safely guided to a connector for connecting to an interface of a vehicle. It has been proposed to use a clip for holding a signal cable configured to be engageable with an opening in a plate arranged between the actuation sided brake pad and an actuation sided part of the brake caliper. This arrangement is known from European patent application publication EP 2 664 815 A and safeguards guidance of the signal cable on a predetermined trajectory from the actuation sided end of the spring hanger to the connector.

However, there is still room for improvement. In particular, it was found that the above prior solutions are unsuitable for certain applications due to clearance issues in a region, where the known clip protrudes from the surface of the plate in order to fix in place the signal cable. For instance, simulations revealed that the known clip extends into the installation space such that it collides with a 19.5" wheel. Therefore, the known arrangement is restricted to applications that only require moderate clearance in that region.

SUMMARY

It is an object of the present disclosure to provide a disc brake that overcomes the above-mentioned issue. In particular, it is an object of the disclosure to provide a disc brake that enables safe guidance of a signal cable from the actuation sided end of the spring hanger to a connector for connecting to an interface of a vehicle, and at the same time leaves more clearance in a region of the opening.

In accordance with the present disclosure, a system is proposed in which a connecting part operatively couples the attachment part and the signal cable guiding part of the signal cable fixation member, the connecting part being configured to space apart a signal cable guide axis of the signal cable guiding part from an engagement axis of the attachment part by a predetermined offset.

It is to be understood that the predetermined offset refers to a distance of a line on a surface of the cover plate (on the side of the signal cable guiding part) drawn perpendicular to the signal cable guide axis and the engagement axis. In one aspect, the offset is preferably 0.2 to 2 cm, more preferably 0.3 to 1 cm, and most preferably 4 to 6 mm.

The term "signal cable guide axis" as used herein refers to a longitudinal axis of a space encircled by the signal cable guiding part along which longitudinal axis the signal cable would extend during operation.

The term "engagement axis" refers to an axis that extends through a center of the attachment part perpendicular to the surface of the cover plate. When the attachment counterpart is a circular opening, the engagement axis essentially coincides with an axial axis of the circle.

In one aspect, the connecting part has an essentially arched or sigmoidal shape. As a result, when the attachment part engages with the attachment counterpart, the signal cable guiding part is displaced towards the lower edge of the cover plate. This means that the signal cable guiding part is shifted closer towards the interior of the accommodation space, thereby leaving more clearance in a region where the known clip protruded from the surface of the plate. The disc brake of the present disclosure is therefore particularly useful in applications requiring large clearance in an installation space of a brake caliper.

In light of the prior art, the proposed design is counter-intuitive as the signal cable guiding part and therefore the signal cable is displaced towards moving and heat-generating parts of the disc brake. However, the safety margin was found to be met and, in addition, the design of the signal cable fixation member allows the signal cable to be guided close to the surface of the cover plate, thereby minimizing such potentially negative influences. Further, in comparison to a re-design of the cover plate, a re-design of the signal cable fixation member is simpler and more cost-effective. Therefore, constructive efforts and costs are kept at a minimum. In addition, in the case of the disc brake of EP 2 664 815 A1, a re-design of the cover plate (e.g., moving the position of the opening) would further make it necessary to take into consideration whether parts of the signal cable fixation member that protrude from a surface of the plate on a actuation side (surface opposite of the signal cable guiding part) would collide with parts of the disc brake or other parts of a vehicle.

When the cover plate is configured to be fastened to the actuation side of the disc brake in the accommodation space of the brake caliper, the cover plate generally has a surface on a wheel side of the disc brake and a surface on the actuation side of the disc brake, a lower edge facing, in operation, a rotor axial axis, an upper edge opposite of the lower edge and side edges in between. The cover plate may be provided with more than one attachment counterpart. This can be useful in order to have several mounting points for a signal cable or to have a suitable configuration independent of whether the signal cable needs to be guided towards the front or towards the back (relative to a vehicle).

When the cover plate is configured to constitute the actuation side of the disc brake in the accommodation space of the brake caliper, the cover plate is preferably an integral part of the brake caliper, such as an integral part of the casted structure of the brake caliper, and in particular the outer surface of the brake caliper in a region of the actuation side of the disc brake in the accommodation space of the brake caliper. Put another way, instead of mounting the signal cable to a separate cover plate, the signal cable fixation member could be directly fixed to the outer surface of the brake caliper on an actuation side of the disc brake in an accommodation space of the brake caliper, which outer surface defines the cover plate.

In accordance with a preferred embodiment according to an aspect of the disclosure, the signal cable guiding part is loop-shaped. The term "loop-shaped", as used herein, refers to a generally circular shape that extends from two elongated elements (here: two connecting elements) that are spaced apart by a distance smaller than the inner diameter of the loop (circle). When the signal cable guiding member is fastened to the cover plate, the inner diameter of the loop may be equal to, but is preferably slightly smaller than, the outer diameter of a signal cable to be encircled in order to clamp the signal cable and avoid sliding thereof.

It is further preferred, according to an aspect, that the loop extends in a longitudinal direction over a segment of the signal cable. Accordingly, the signal cable guiding part has preferably a tubular shape. As described for the loop shape, the tubular form may have a corresponding opening (here: preferably a slit-shaped opening on its shell surface) to allow crosswise introduction of a signal cable, when the signal cable guide is detached from the cover plate. The slit-shaped opening preferably opens to a space encompassed by the connecting part. The slit-shaped opening may open to a space between the first connecting element and the second connecting element.

It is further preferred, according to an aspect, that the signal cable fixation member is elastically deformable, in particular bendable. The elasticity allows the signal cable fixation member to snap around the signal cable. For example, the signal cable fixation member may be at least partially made of a spring plate, a spring wire, or plastic. To ease production and reduce costs, the signal cable fixation member is preferably made from one piece.

In one aspect, in accordance with a preferred embodiment, a signal cable introduction space extends from the attachment part through the connecting part to the signal cable guiding part. The signal cable introduction space, as understood herein, is a space that facilitates crosswise introduction of the signal cable into the signal cable guiding part when the signal cable guide is detached from the cover plate. Referring again to the aforementioned embodiment, the signal cable introduction space may extend between the first elongated attachment element and the second elongated attachment element, through between the first connecting element and the second connecting element, and open towards a space encircled by the signal cable guiding part.

According to an aspect of the disclosure, it is also preferred that the connection between the attachment part and the attachment counterpart is non-rotatable. This avoids the risk that the signal cable runs offset from a predetermined trajectory. A non-rotatable connection may, for instance, be obtained when the attachment counterpart is formed as an opening that has a non-spherical shape, such as a rectangular shape.

More preferably, according to an aspect, the attachment part and the attachment counterpart include corresponding positioning members. The corresponding positioning members are configured to define a single predetermined orientation of the attachment part and the attachment counterpart. The expression "single predetermined orientation" denotes a connection that is only formed when the attachment part and the attachment counterpart are brought together in a specific orientation but is not formed when the attachment part has any other orientation with respect to the attachment counterpart. For the purposes of the present invention, the single predetermined orientation is preferably obtained by providing the attachment part with two differentially shaped and/or sized attachment elements for engaging with a correspondingly shaped and/or sized attachment counterpart. As a result, misassembly can be avoided. In particular, it is not possible to mount the signal cable fixation member in such a way that the signal cable guiding part is offset to a region where clearance is needed, i.e. towards the upper edge of the cover plate.

In one aspect, in accordance with a preferred embodiment, the attachment counterpart is in or on the cover plate in a region that extends radially across the outer periphery of the brake caliper.

In other words, the region of the cover plate on or in which the attachment counterpart, preferably the opening, is formed protrudes radially beyond the casted structure of the brake caliper in a region of the actuation side.

This region is not only sufficiently remote from the moving and heat-generating parts of the disc brake and offer adequate wear and heat protection for the signal cable, but is also easily accessible so as to provide an easy and quick opportunity to mount a signal cable to a disc brake.

It is further preferred, according to an aspect, that the attachment part and the attachment counterpart are releasably attached to each other. Thereby, the attachment part can be detached from the attachment counterpart during maintenance, repair and the like.

In accordance with the disclosure, a system as disclosed herein is preferred, where the connecting part is bent towards a lower edge of the cover plate so that the signal cable guiding part abuts against the cover plate. Thereby, the signal cable guiding part is supported by a surface of the cover plate. A higher stability of the signal cable fixation member is obtained. Further, a distance to heat-generating and moving parts is maximized, thereby lowering risk of failure due to influences by heat or abrasion. In addition, installation space is minimized.

It is particularly preferred, according to an aspect, that the attachment counterpart is formed as an opening in the cover plate. The opening is preferably provided in the upper left and upper right region of the cover plate. More preferably, one opening is provided in the upper left and one opening is provided in the upper right region of the cover plate. It will be understood that in this case the attachment part is introduced in the opening from a, preferably, wheel sided surface of the cover plate in a generally perpendicular direction. In addition to avoidance of a re-design of the known cover plate, this embodiment has the advantage that there are no additional protruding parts on the surface of the cover plate for fastening the signal cable fixation member, which protruding parts could hamper maintenance, replacement of the brake pads, and the like, or might get damaged. In addition, the configuration has a simple design and is easy to produce.

Unless otherwise indicated, information with respect to position, orientation and size, whether given as absolute values or relative indications, refer to an operational configuration where the attachment part is engaged with the attachment counterpart.

In one aspect, according to a preferred embodiment of the disclosure, the attachment part extends through the opening and is fastened by non-positive fit and/or positive fit. Preferably, the attachment part is fastened by both non-positive fit and positive fit.

For the purposes of the present disclosure, it is particularly preferred, in one aspect, that the attachment part is formed as a first elongated attachment element and a second elongated attachment element. The first elongated attachment element and the second elongated attachment element are preferably spaced apart from each other, when no external force is exerted.

Fastening by non-positive fit is preferably realized, in one aspect, by a configuration where the first elongated attachment element and the second elongated attachment element are approachable against an elastic restoring force so as to allow them to be inserted into the opening upon forcing the elongated attachment elements towards each other, and to be urged against the inner contour of the opening in the cover plate by the elastic restoring force. Therefore, it is preferred that the signal cable fixation member is at least partially elastic, as described further above.

In addition or alternatively, fastening by positive fit is preferably realized, in one aspect, by a configuration where the first elongated attachment element and the second elongated attachment element have hook-shaped ends facing away from each other so as to be retained by a surface of the cover plate.

A system as disclosed herein is further preferred, in one aspect, where the connecting part is formed as a first connecting element extending from the first elongated attachment element and a second connecting element extending from the second elongated attachment element. One of the first and second connecting elements is preferably longer, and one or both of the first and second connecting elements are preferably bent so as to produce the offset between the signal cable guide axis and the engagement axis.

Similar to the first elongated attachment element and the second elongated attachment element, the first connecting element and the second connecting element are, in one aspect, preferably spaced apart from each other, when no external force is exerted. This enables crosswise introduction of a signal cable. The term "crosswise introduction", as understood herein, describes an introduction of a signal cable in an orientation where the signal cable's longitudinal axis is substantially perpendicular to the direction of introduction.

A preferred system, in one aspect, includes a first elongated attachment element having a different size and/or shape than a second elongated attachment element and an opening that is correspondingly shaped and/or sized. For example, the first elongated attachment element has a first width that fits to a first width of the opening in an engagement region of the first elongated attachment element, whereas the second attachment element has a second width that fits to a second width of the opening in an engagement region of the second elongated attachment element, wherein the first widths and the second widths differ. The expression "fits to a width of the opening" is to be understood to refer to a width that is (slightly) bigger than the width of the attachment element but excludes a case where the wider attachment element fits in both engagement regions.

According to a specific embodiment, in one aspect, the opening has a first region with a first width and a second region with a second width, the first region lying closer to the upper edge of the cover plate than the second region and the first width being smaller than the second width. Further, the signal cable fixation member has a first elongated attachment element having a first width that fits in the first region of the opening and a second elongated attachment element having a second width that fits in the second region of the opening but does not fit in the first region of the opening, and the second width preferably is bigger than the first width of the first region.

Another aspect of the present disclosure pertains to a pad wear warning indication system. The pad wear warning system may include: a pad wear sensor for assessing the wear of a brake pad, a signal cable connected to the pad wear sensor, and a system as disclosed herein for mounting the signal cable to the cover plate of a disk brake.

Another aspect of the present disclosure pertains to a disc brake. The disc brake may include a brake caliper, brake pads, and a rotor in between the brake pads accommodated in an accommodation space of the brake caliper, and a system as disclosed herein for mounting the signal cable to the cover plate of a disk brake or a pad wear warning indication system as disclosed herein.

Another aspect of the present disclosure pertains to a signal cable fixation member for mounting a signal cable to a cover plate of a disc brake. The signal cable fixation member in particular may include an attachment part and a signal cable guiding part, the attachment part being configured to engage with an attachment counterpart in or on the cover plate and the signal cable guiding part being configured to guide a signal cable towards a side edge of the cover plate, and includes a connecting part as disclosed herein. Preferably, in one aspect, the signal cable fixation member is configured as disclosed herein.

Another aspect of the present disclosure pertains to use of cable fixation member as disclosed herein for mounting a signal cable to a cover plate of a disc brake.

The embodiments and aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of other aspects.

BRIEF DESCRIPTION OF THE DRAWINGS

These and other aspects, features and/or technical effects will be apparent from and elucidated with reference to the illustrations described hereinafter, in which.

DETAILED DESCRIPTION OF THE DRAWINGS

Figure 1:
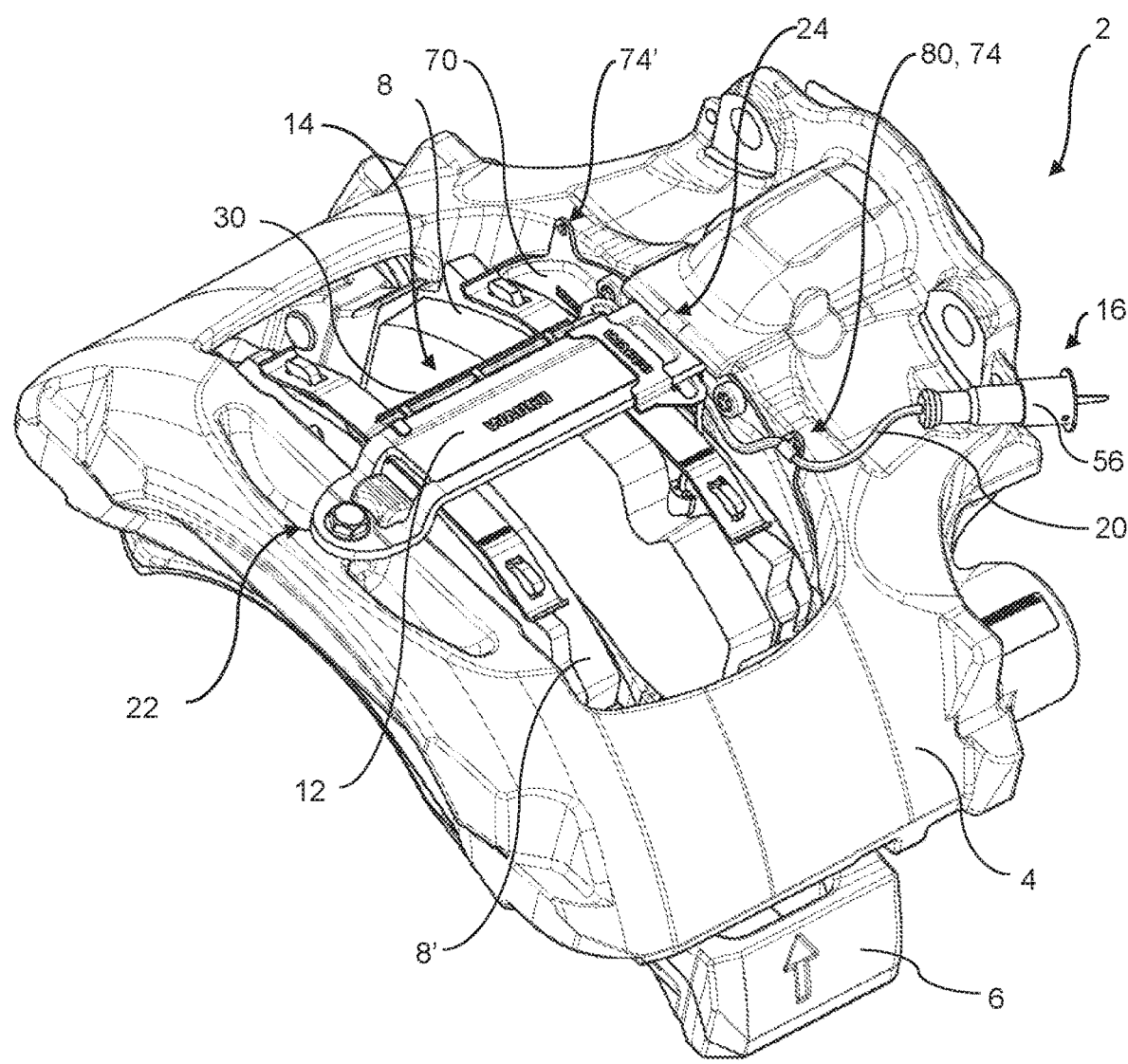
FIG. 1 is a perspective view of a disc brake including an embodiment of a system for mounting a signal cable to a disc brake according to an aspect of the disclosure.

FIG. 1 shows a disc brake 2 comprising a system according to a preferred embodiment of the invention for mounting a signal cable 20 to a surface of the disc brake 2. The disc brake 2 sits on a brake carrier 6, which is mountable to a corresponding receiving section of a vehicle. The disc brake 2 comprises a brake caliper 4, which forms an accommodation space for, among other components, brake pads 8, 8' and, during operation, a rotor, which is not shown in FIG. 1, in between the brake pads 8, 8'.

The brake pads 8, 8' are held in position by a spring hanger 12. The spring hanger 12 is connected to the caliper 4 by a spring hanger seat 24 on one side and by spring hanger fixation device 22 on the other side. After releasing the spring hanger fixation device 22 and guiding the spring hanger 12 out of its seat 24, the spring hanger 12 may be removed. When the spring hanger 12 is removed, the brake pads 8, 8' may be removed likewise and be exchanged.

To assess the degree of wear of the brake pads 8, 8', the disc brake 2 includes a pad wear warning indication system 16. This pad wear warning indication system 16 includes wear sensors, a signal cable 20, a mounting device 14 for mounting the signal cable 20 to the spring hanger 12, a system including a cover plate 70 and a signal cable fixation member 80 for mounting the signal cable 20 to the cover plate 70, and a connector 56. Instead of mounting the signal cable 20 to the cover plate 70, the signal cable fixation member 80 could be directly fixed to the outer surface of the brake caliper 4 on an actuation side of the disc brake in an accommodation space of the brake caliper 4, such that the outer surface of the brake caliper 4 itself would then constitute the cover plate as disclosed herein. Typically, each wear sensor is associated with one brake pad 8, 8'. As the wear sensors need to be connected to a vehicle data system, the connector 56 is located in the proximity of the region of the caliper 4 on a vehicle side (actuation side), the connector 56 being configured to be connectable to a vehicle. Especially for the wear sensor associated with brake pad 8' (located on the side opposite the vehicle side/actuation side), there arises a need to guide the signal cable 20 from the proximity of brake pad 8' towards the connector 56.

To achieve this, a mounting device 14 is mounted onto the spring hanger 12. The mounting device 14 includes a cable guide 30, to which the signal cable 20 is fastened. With the help of this, the signal cable 20 is guided along the spring hanger 12 towards the wear sensor, which is associated with brake pad 8.

To bridge the distance between an end of spring hanger 12 on the actuation side (near brake pad 8) to the connector 56, the present invention provides for cover plate 70 and signal cable fixation member 80. The cover plate 70 extends over the whole of an inner surface of the caliper 4 on an actuation side of the disc brake 2 and projects beyond the upper periphery of the brake caliper 4. In the projecting region, there are provided one or more attachment counterparts.

Figure 2:
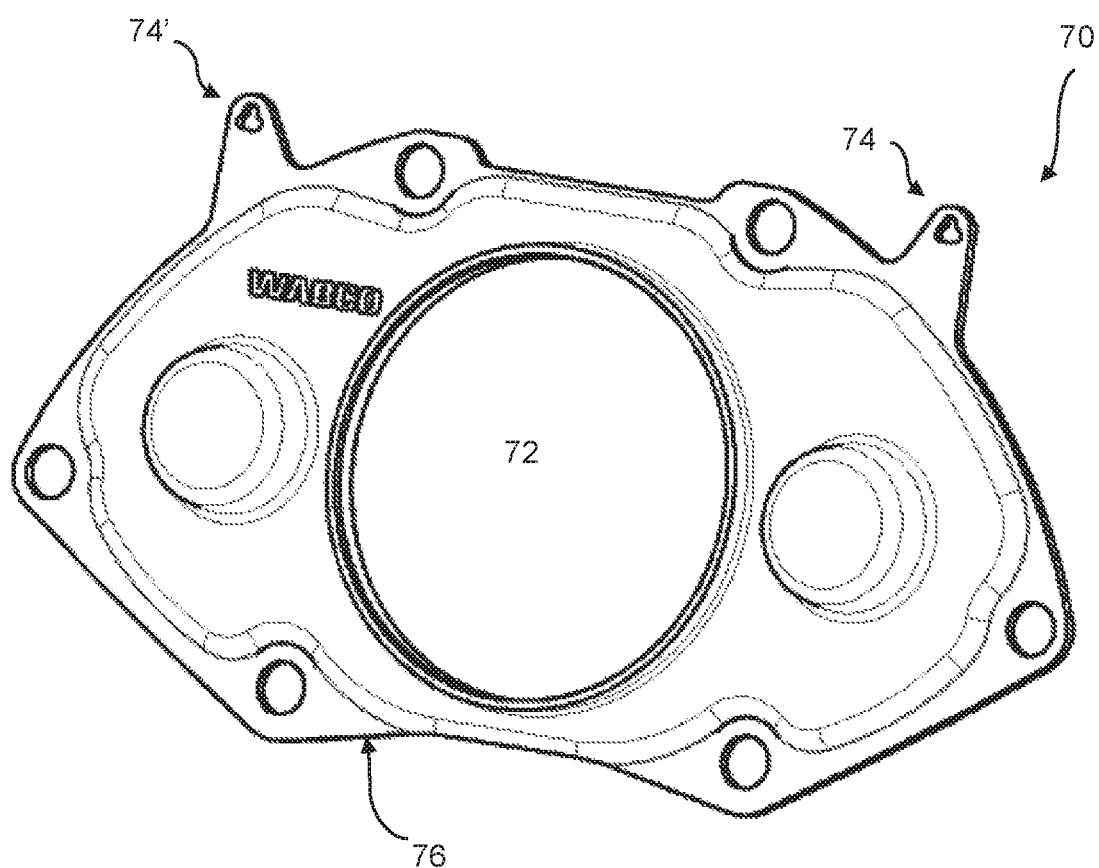
FIG. 2 is a perspective view of a cover plate used in an embodiment of the disc brake as shown in FIG. 1, according to an aspect of the disclosure.

In the shown embodiment, one opening 74 is provided in the upper right region of the cover plate 70 and one opening 74' is provided in the upper left region of the cover plate 70, which can be best seen in FIG. 2. Further, the preferably sheet-like metal cover plate 70 has an actuation opening 72 in a central region of the cover plate 70 that is configured to allow passage of an actuation device from an actuation unit in the interior of the caliper 4 during operation in order to actuate the disc brake 2.

Figure 3:
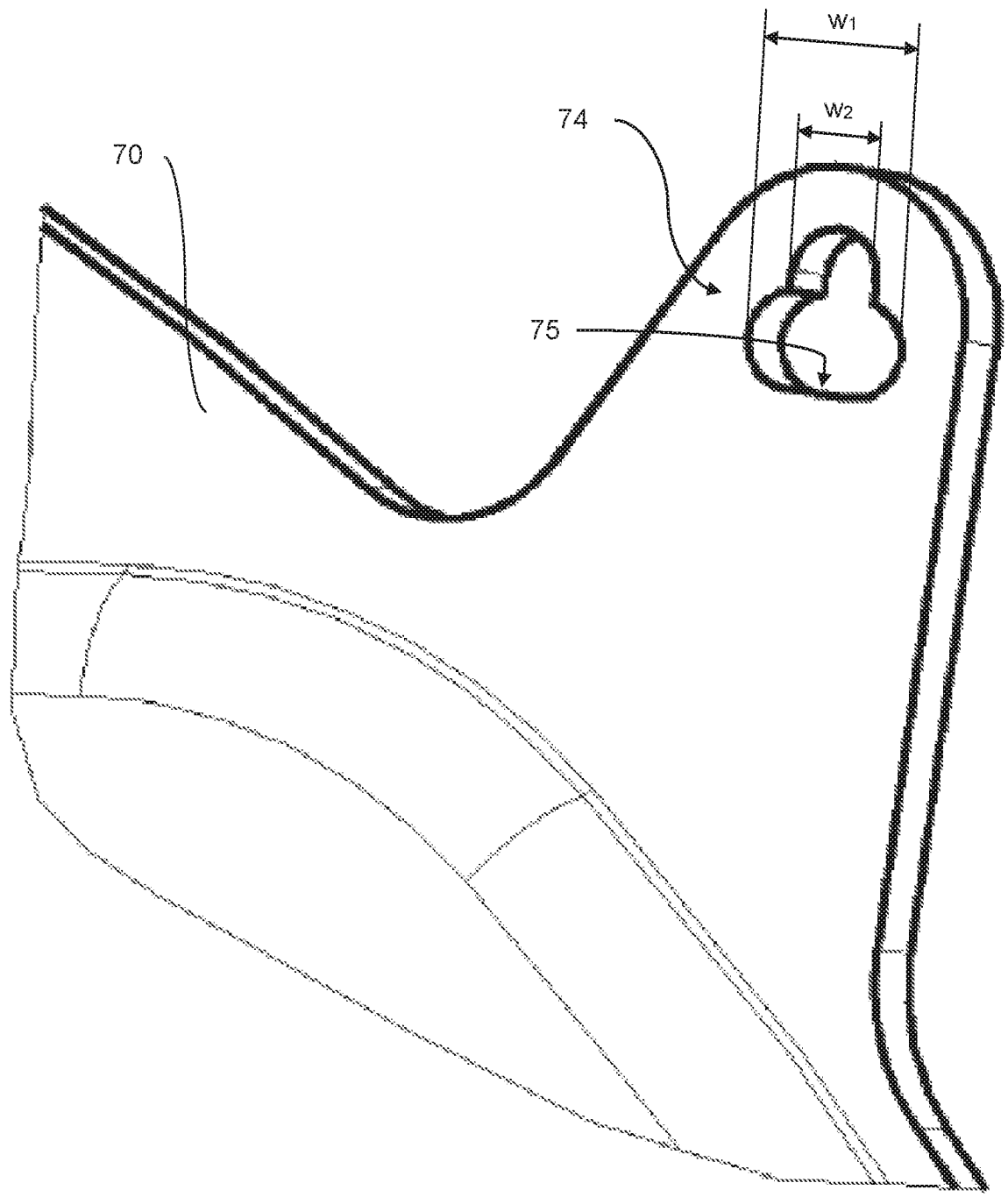
FIG. 3 is an enlarged perspective view of a detail of the cover of FIG. 2 according to an aspect of the disclosure.
Figure 8:
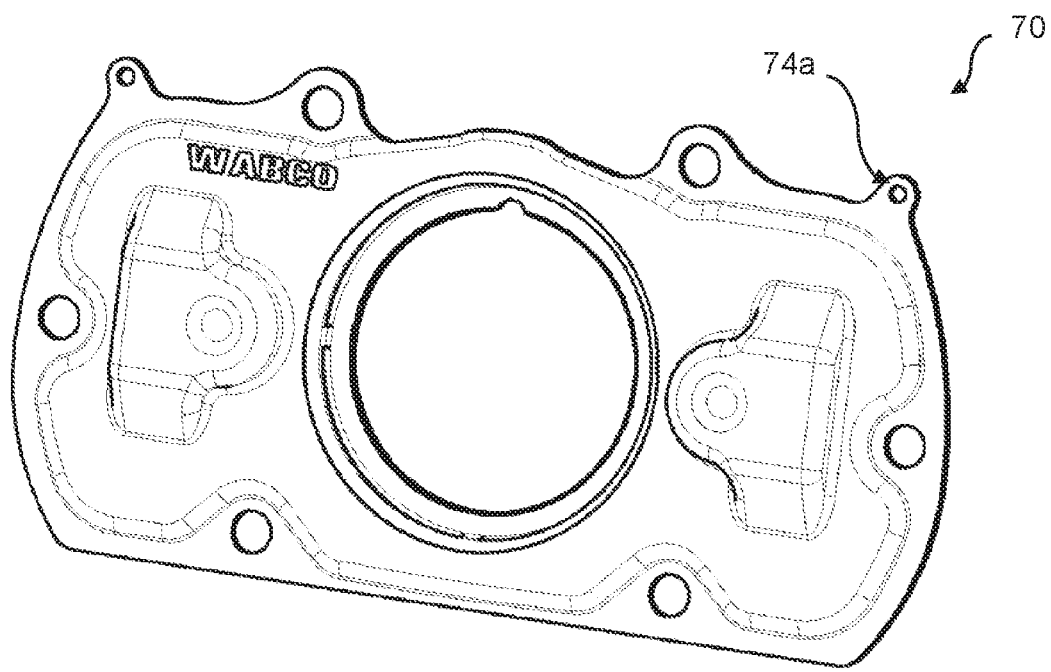
FIG. 8 is a perspective view of a cover plate used in the disc brake shown in FIG. 7 according to an aspect of the disclosure.
Figure 9:
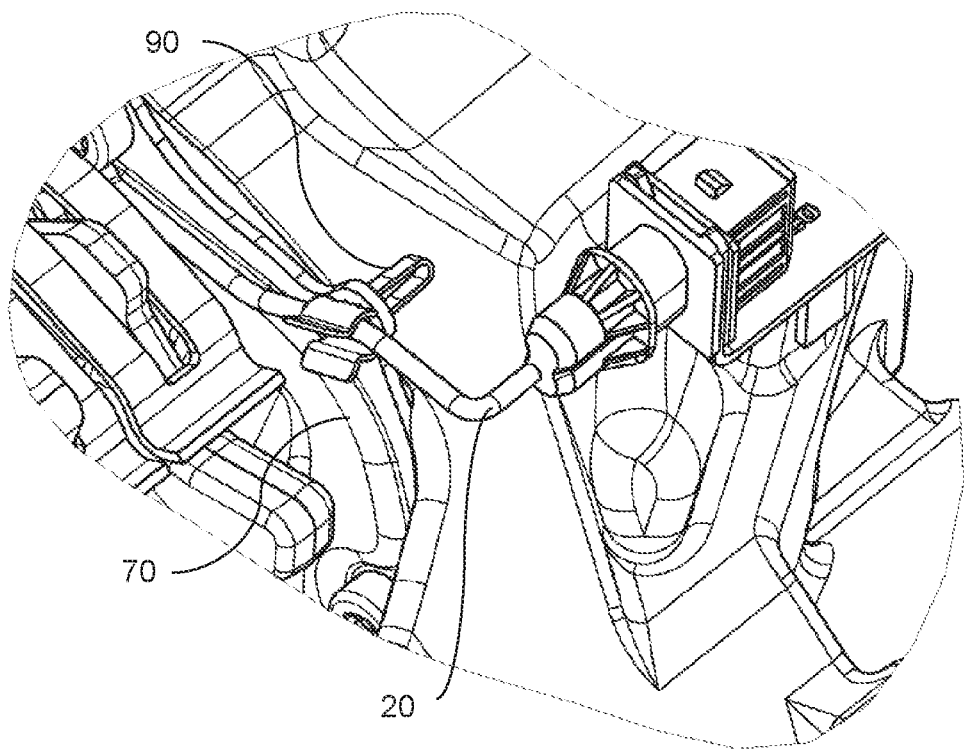
FIG. 9 is an enlarged perspective view of a disc brake as shown in FIG. 7.
Figure 10:
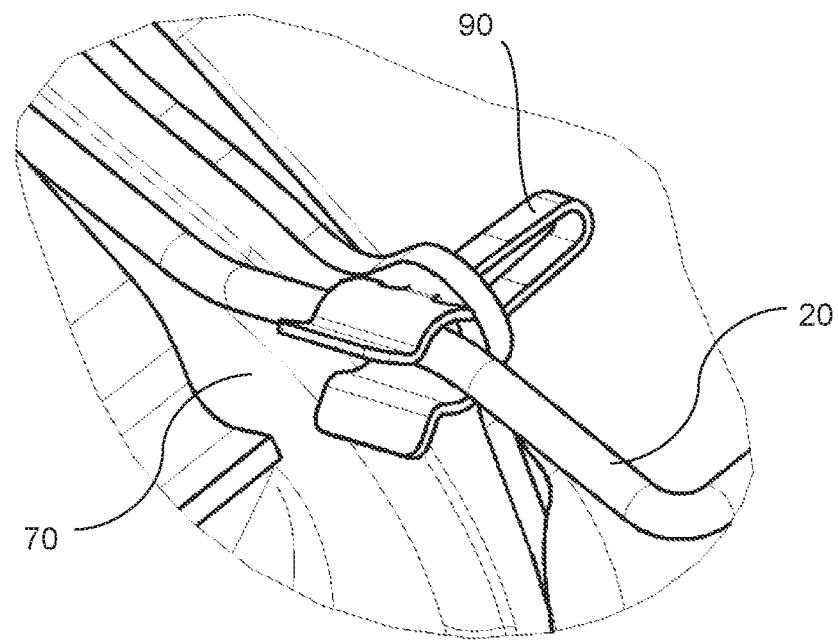
FIG. 10 is an enlarged perspective view of a disc brake as shown in FIG. 7.
Figure 11:
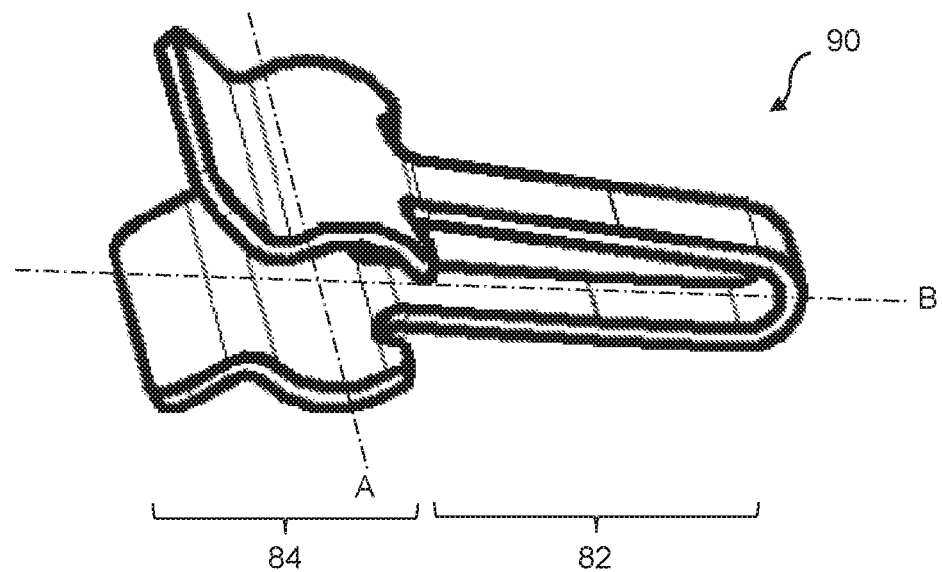
FIG. 11 is a perspective view of a clip for mounting a signal cable to a cover plate of a disc brake as shown in FIGS. 7 and 8.

FIG. 3 shows an enlarged view of the opening 74 shown in FIG. 2. The opening 74 has a lower region with a width $w_1$ and an upper region with a width $w_2$, wherein width $w_2$ is smaller than width $w_1$. However, while the depicted opening 74 is preferred due to the advantages associated with it, in particular when combined with a signal cable fixation member as described herein (cf. e.g. FIG. 6), it should be noted that the present invention is not limited to a particular shape of the opening 74 or 74'. Therefore, also circular openings as shown in the known cover plate of FIG. 8 could be principally used according to an aspect of the disclosure.

Figure 4:
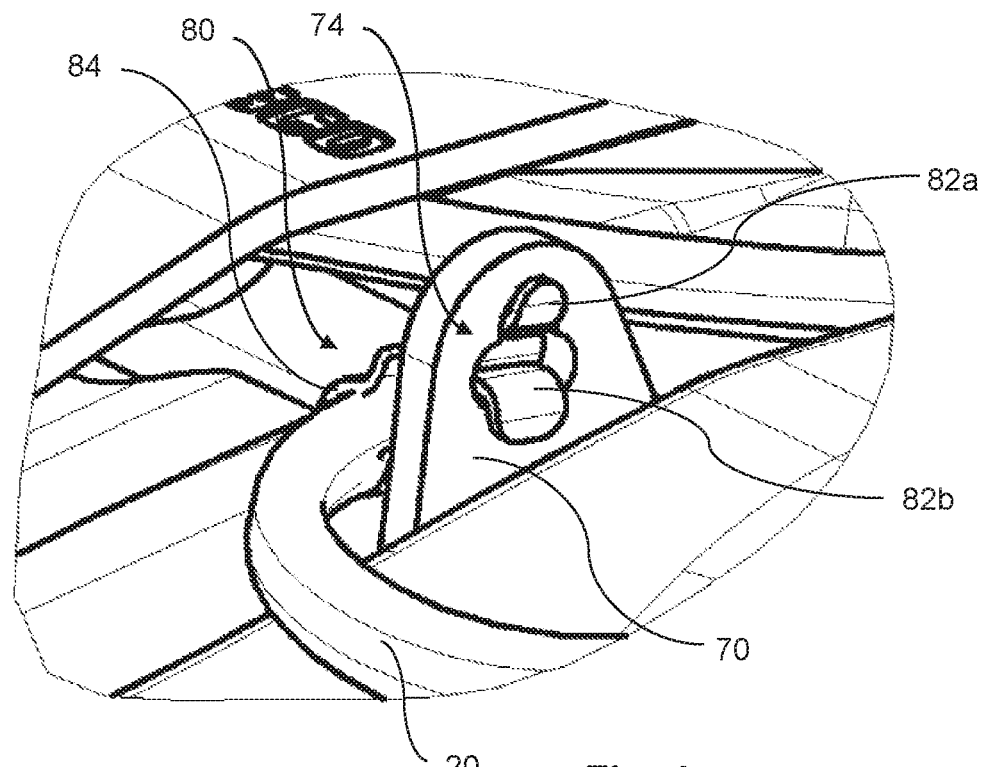
FIG. 4 is a perspective of a system for mounting a signal cable to a disc brake having a cover plate as shown in FIG. 2 according to an aspect of the disclosure.

In the enlarged view of FIG. 4, it can be seen that the signal cable fixation member 80 is inserted into the opening 74 so that the attachment part, which in this example is formed as two hook-shaped attachment elements 82a, 82b, is retained by a surface of the cover plate 70. In addition, elastic restoring forces urge the attachment elements 82a, 82b against the boundary or inner contour 75 (shown in FIG. 3) of the opening 74.

Figure 5:
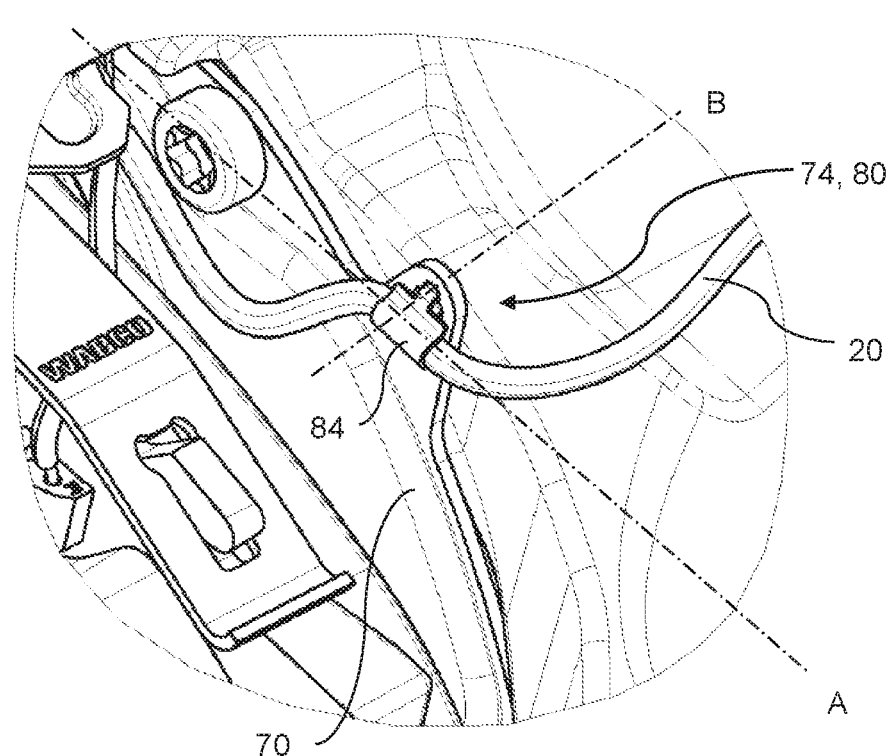
FIG. 5 is a different perspective view of a system for mounting a signal cable to a disc brake comprising a cover plate as shown in FIG. 2 according to an aspect of the disclosure.

FIG. 5 provides a different view, where the signal cable guiding part 84 of the signal cable fixation member 80 is viewed from a front side. The signal cable guiding part 84 has a tubular shape so that a longitudinal section of the signal cable 20 is encircled by the signal cable guiding part 84. A signal cable guide axis A essentially coincides with a longitudinal axis of the signal cable 20 and is spaced apart from an engagement axis B, which coincides with a central axis of the opening 74. The signal cable 20 comes to lie on or adjacent to a surface of the cover plate 20 in a region that is shifted towards the lower edge 76 of the cover plate 20 relative to the opening 74.

Figure 6:
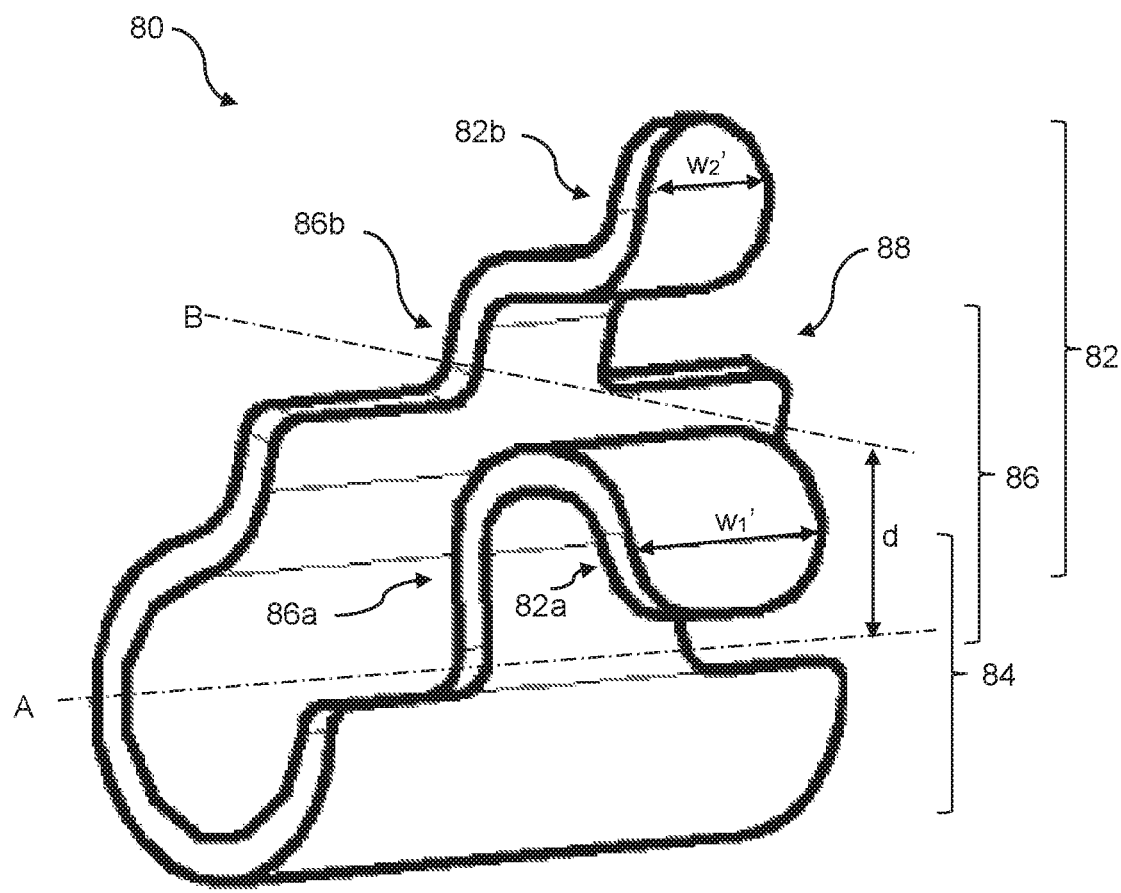
FIG. 6 is an enlarged view of a signal cable fixation member for mounting a signal cable to a disc brake as shown in FIGS. 4 and 5 according to an aspect of the disclosure.
Figure 7:
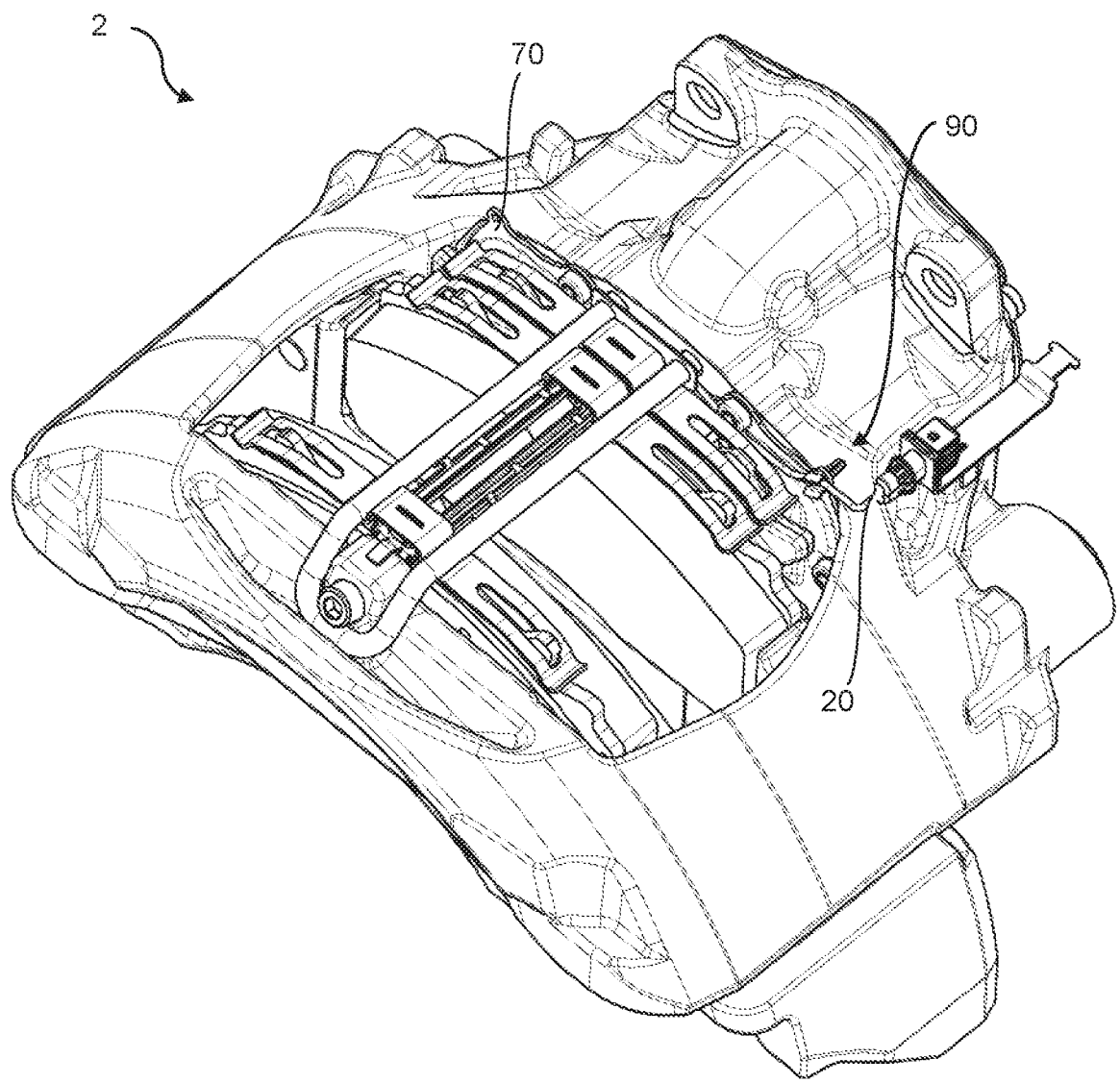
FIG. 7 is a perspective view of a disc brake including a conventional clip for mounting a signal cable to a cover plate of a disc brake according to an aspect of the disclosure.

FIG. 6 shows the signal cable fixation member 80 of FIGS. 4 and 5. As can be seen, the signal cable guide axis A, which essentially coincides with the longitudinal axis of the signal cable 20 is spaced apart from the engagement axis B, which coincides with the central axis of the opening 74a by an offset d. Put another way, the axis A is offset below the axis B. Further, the attachment part 82 is formed as a first elongated attachment element 82a having a first width $w_1'$ and a second elongated attachment element 82b having a second width $w_2'$, both of which have hook-shaped ends extending in opposite directions. The widths $w_1'$, $w_2'$ are configured to fit in the corresponding regions in the opening 74a. Thereby, a single predetermined orientation is obtained.

The connecting part 86 is formed as a first connecting element 86a extending from the first elongated attachment element 82a and connecting to one end of the signal cable guiding part 84, and a second connecting element 86b extending from the second elongated attachment element 82b and connecting to the other end of the signal cable guiding part 84. Further, one of the first and second connecting elements 86a, 86b is longer, and both of the first and second connecting elements 86a, 86b are bent so as to produce the offset d between the signal cable guide axis A and the engagement axis B. To put it simply, the signal cable guiding part 84 is displaced from the attachment part 82 towards the lower edge 76 of the cover plate 70. In the signal cable fixation member 80, a signal cable 70 can be introduced from the open end of attachment part 82. From this end, a signal cable introduction space 88 extends through the connecting part 86 to the signal cable guiding part 84.

FIGS. 7 to 11 depict a conventional disc brake 2. The disc brake 2 shown in FIGS. 7 to 11 largely corresponds to the disc brake 2 detailed above in FIGS. 1-6, except that it features a clip 90 for mounting a signal cable 20 to a cover plate 70 having circular openings 74a, rather than the signal cable fixing member 80. As mentioned above, it is principally possible to use a cover plate 70 having circular openings 74a in the present disclosure, such as those best seen in FIG. 8. The trajectory of the signal cable 20 runs over the opening in the cover plate 70. As can be understood from FIGS. 9 to 11, the clip 90 lacks a connecting part that is configured to space apart the signal cable guide axis A of the signal cable guiding part 84 from an engagement axis B of the attachment part 82. Instead, the engagement axis B generally intersects signal cable guide axis A.

While the above description constitutes the preferred embodiments of the present invention, it will be appreciated that the invention is susceptible to modification, variation and change without departing from the proper scope and fair meaning of the accompanying claims.

What is claimed is:

1. A system for mounting a signal cable (20) to a disc brake (2), the system comprising:
   a cover plate (70) configured to be fastened to or constituting an actuation side of the disc brake (2) in an accommodation space of a brake caliper (4), the cover plate including an actuator opening (72) in a region of the cover plate (70) configured to allow passage of an actuation device therethrough; and
   a signal cable fixation member (80) for mounting the signal cable (20) to the cover plate (70), the signal cable fixation member (80) including an attachment part (82) and a signal cable guiding part (84), the attachment part (82) being sized and configured to connect with an attachment counterpart (74, 74', 74a) of the cover plate (70) and the signal cable guiding part (84) being configured to guide the signal cable (20) towards a side edge of the cover plate (70),
   wherein the system comprises a connecting part (86) operatively coupling the attachment part (82) and the signal cable guiding part (84), the connecting part (86) spacing apart a signal cable guide axis (A) of the signal cable guiding part (84) from an engagement axis (B) of the attachment part (82) by an offset (d);
   wherein the attachment counterpart (74, 74', 74a) comprises an opening (74, 74', 74a) in the cover plate (70);
   wherein the attachment part (82) comprises a first elongated attachment element (82a) and a second elongated attachment element (82b);
   wherein the first elongated attachment element (82a) has a different size and/or shape than the second elongated attachment element (82b) and the opening (74, 74') is correspondingly shaped or sized.

2. The system of claim 1, wherein the connecting part (86) has an essentially arched or sigmoidal shape.

3. The system of claim 1, wherein the signal cable guiding part (84) is loop-shaped.

4. The system of claim 1, wherein the signal cable fixation member (80) is elastically deformable and bendable.

5. The system of claim 1, wherein a connection between the attachment part (82) and the attachment counterpart (74, 74', 74a) is non-rotatable.

6. The system of claim 1, wherein the attachment part (82) extends through the opening (74, 74', 74a) and is fastened by non-positive fit or positive fit.

7. The system of claim 1, wherein the first elongated attachment element (82a) and the second elongated attachment element (82b) are approachable against an elastic restoring force so as to allow them to be inserted into the opening of the attachment counterpart upon forcing the elongated attachment elements (82a, 82b) towards each other, and to be urged against an inner contour (75) of the opening (74, 74', 74a) in the cover plate (70) by the elastic restoring force.

8. The system of claim 1, wherein the first elongated attachment element (82a) and the second elongated attachment element (82b) have hook-shaped ends facing away from each other so as to be retained by a surface of the cover plate (70).

9. The system of claim 1, wherein the connecting part (86) comprises a first connecting element (86a) extending from the first elongated attachment element (82a) and connecting to one end of the signal cable guiding part (84), and a second connecting element (86b) extending from the second elongated attachment element (82b) and connecting to another end of the signal cable guiding part (84), wherein one of the first and second connecting elements (86a, 86b) is longer, and one or both of the first and second connecting elements (86a, 86b) is bent so as to produce the offset (d) between the signal cable guide axis (A) and the engagement axis (B).

10. The system of claim 1, further comprising a pad wear warning indication system (16) including a pad wear sensor for assessing the wear of a brake pad (8, 8') and the signal cable (20) connected to the pad wear sensor.

11. The system of claim 1, further comprising the disc brake (2) including the brake caliper (4) and brake pads (8, 8') defining a space for a rotor in between the brake pads (8, 8') accommodated in an accommodation space (10) of the brake caliper (4).

12. The system of claim 1, wherein the signal cable fixation member (80) is attachable to the attachment counterpart (74, 74') in only a single predetermined orientation.

13. A signal cable fixation member (80) for mounting a signal cable (20) to a cover plate (70) of a disc brake (2), the signal cable fixation member (80) comprising:
   a signal cable guiding part (84) configured to guide the signal cable (20) towards a side edge of the cover plate (70),
   an attachment part (82) configured to engage with an attachment counterpart (74, 74', 74a) in or on the cover plate (70),
   a connecting part (86) between the attachment part (82) and the signal cable guiding part (84), the connecting part (86) configured to space apart a signal cable guide axis (A) of the signal cable guiding part (84) from an engagement axis (B) of the attachment part (82) by an offset (d);

wherein the attachment part (82) includes a first elongated attachment element (82*a*) and a second elongated attachment element (82*b*);

wherein the first elongated attachment element (82*a*) has a different size or shape than the second elongated attachment element (82*b*) for orienting the signal cable fixation member (80) in a predetermined orientation.

14. The signal cable fixation member (80) of claim 13, wherein the first elongated element (82*a*) has a width greater than the second elongated attachment element (82*b*).

15. A signal cable fixation member (80) for mounting a signal cable (20) to a cover plate (70) of a disc brake (2), the signal cable fixation member (80) comprising:

a signal cable guiding part (84) configured to guide the signal cable (20) towards a side edge of the cover plate (70), an attachment part (82) configured to engage with an attachment counterpart (74, 74', 74*a*) in or on the cover plate (70), a connecting part (86) between the attachment part (82) and the signal cable guiding part (84), the connecting part (86) configured to space apart a signal cable guide axis (A) of the signal cable guiding part (84) from an engagement axis (B) of the attachment part (82) by an offset (d);

wherein the attachment part (82) includes a first elongated attachment element (82*a*) and a second elongated attachment element (82*b*);

wherein the connecting part (86) comprises a first connecting element (86*a*) extending from the first elongated attachment element (82*a*) and connecting to one end of the signal cable guiding part (84), and a second connecting element (86*b*) extending from the second elongated attachment element (82*b*) and connecting to another end of the signal cable guiding part (84), wherein one of the first and second connecting elements (86*a*, 86*b*) is longer, and one or both of the first and second connecting elements (86*a*, 86*b*) is bent so as to produce the offset (d) between the signal cable guide axis (A) and the engagement axis (B).

* * * * *